W. L. BLISS.
STOP CHARGE CURRENT REGULATOR.
APPLICATION FILED MAY 1, 1911. RENEWED APR. 6, 1917.
1,246,854.  Patented Nov. 20, 1917.
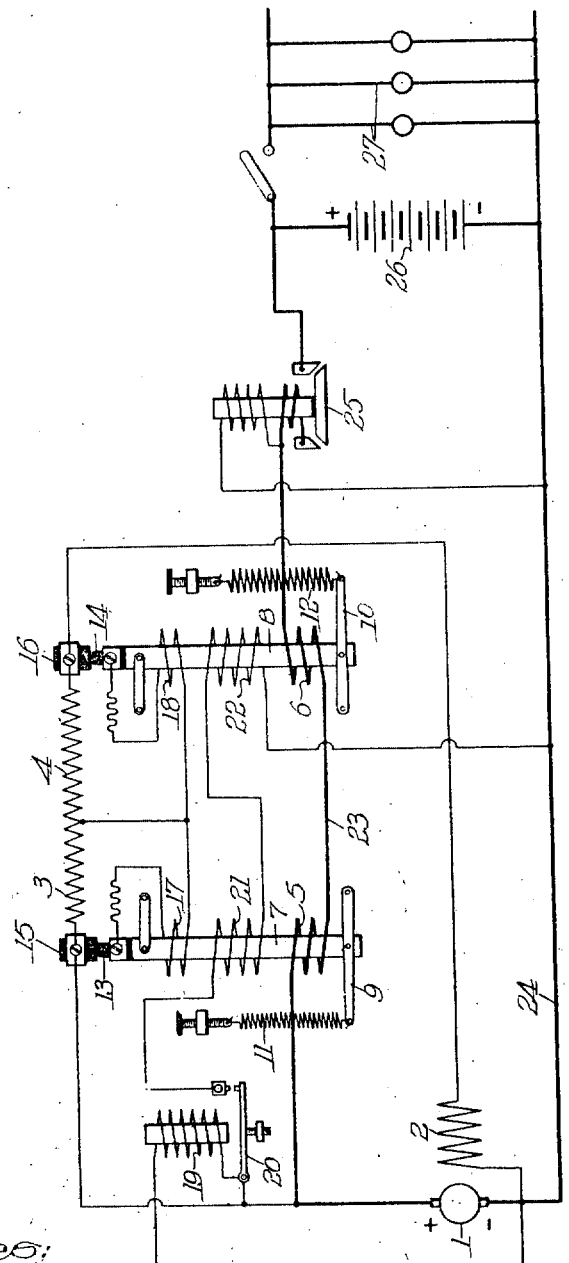

UNITED STATES PATENT OFFICE.

WILLIAM L. BLISS, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

STOP-CHARGE CURRENT-REGULATOR.

1,246,854.                Specification of Letters Patent.        Patented Nov. 20, 1917.

Application filed May 1, 1911, Serial No. 624,479. Renewed April 6, 1917. Serial No. 160,308.

*To all whom it may concern:*

Be it known that I, WILLIAM L. BLISS, a citizen of the United States, residing at Niagara Falls, in the county of Niagara and State of New York, have invented new and useful Improvements in Stop-Charge Current-Regulators, of which the following is a full, clear, concise, and exact description, reference being had to the accompanying drawing, forming a part of this specification.

My invention relates to a stop charge regulator and to a system of electrical distribution employing such a regulator. One of the objects of the invention is to provide improved means for regulating to a constant value the current output of a generator, until a storage battery which is connected thereto is fully charged. Another object is to provide a regulator which will discontinue the battery charging current after the battery voltage has risen a predetermined amount which will be sensitive and positive in operation, which will be simple in construction and which will operate efficiently. Certain broad features of the invention herein disclosed are described and claimed in my co-pending stop and taper charge applications, Serial Nos. 624,109 and 624,110.

The drawings illustrate a preferred form of regulator applied to a car lighting system in which a variable speed generator is employed. The regulator is adapted, of course, for use in other systems and may be embodied in various forms.

In the car lighting system illustrated, I provide a generator having an armature 1, and a shunt field winding 2 having in series therewith two resistances 3 and 4, one of which is preferably greater than the other, and both of which are normally short circuited. The generator field resistance is varied by rapidly making and breaking the short circuit around these resistances. This operation is controlled by two series windings 5 and 6 connected in the main circuit. Each winding or solenoid is provided with a core 7 and 8, the lower ends of which are attached to pivoted levers 9 and 10 normally drawn up by springs 11 and 12. Spring 12 is preferably stronger than spring 11, and both springs may have their tensions adjusted by the adjustable nuts to which they are attached. Each of the cores 7 and 8 is adapted to vibrate rapidly, as hereinafter described, and each carries a contact member or electrode 13, 14, at its upper end adapted to coöperate with corresponding fixed electrodes 15 and 16 to short circuit the corresponding resistances 3 and 4.

Auxiliary coils 17, 18 are connected in series with the generator shunt field winding for the purpose of quickening the vibration of the electrodes. A voltage responsive coil 19 is connected across the generator terminals and is adapted upon predetermined rise in the generator voltage, due to an increase in the counter-electromotive force of the battery, to close the pivoted relay arm 20 thereby connecting the voltage coils 21 and 22 in a shunt circuit across the mains 23 and 24 and cutting down the battery charging current as hereinafter described.

The automatic switch 25 is adapted upon predetermined rise in voltage to connect the generator with the work circuit, comprising the battery 26 and the lamp circuit 27 arranged in parallel branches. Said switch also disconnects the generator from the battery when the voltage of the former falls below that of the latter.

The operation of the system is substantially as follows: When the generator is at rest, the automatic switch is open and the battery carries the lamp load, if any lamps are connected in circuit. The resistances 3 and 4 are short circuited so that the generator field resistance is a minimum. When the generator begins to excite itself, due to rotation of the armature, the voltage increases with the speed until the point is reached at which the automatic switch closes. This occurs when the generator voltage is substantially equal to or in excess of the battery voltage. The generator now charges the storage battery and carries the lamp load, if any. If the generator current tends to rise above a predetermined value the increased energization of the series coil 5 separates the short circuiting contacts 13 and 15 thereby introducing into the generator field circuit the resistance 3 which is of less value than the resistance 4. The increased field resistance reduces the generator output and permits the spring 11 to raise the core and again short circuit the resistance 3. This cycle of operation is repeated rapidly so that the time lag in the field winding 2 prevents the magnetism thereof from rising or falling to the maximum value. Upon still further tendency of the generator current to increase, the character of the vibrations changes so that the resistance 3 is introduced into circuit for successively longer intervals of time, whereby the effective value thereof is increased to offset the tendency toward an increase in the current delivered by the generator. Upon still further tendency of the generator current to increase, the core 7 is held down by series winding 5 whereby the resistance 3 is in circuit continuously, and the energization of the second series coil 6 becomes sufficient to overcome the pull of the stronger spring 12, whereby the core 8 is rapidly vibrated to introduce the larger resistance 4 intermittently into the generator circuit in addition to the resistance 3. The two resistances and the two sets of vibrating contacts are sufficient to confine the current under ordinary circumstances. It is apparent, however, that a greater or less number of resistances and short circuiting contacts may be provided, if desired, to meet varying requirements.

The auxiliary coils 17 and 18 assist the series coils 5 and 6 in opening the short circuit around the resistances thereby accelerating the vibrations. These coils are deënergized, however, as soon as the circuit is open at the corresponding movable electrode 13 or 14 thereby permitting the springs to return the respective cores quickly to a short circuiting position. Although I have disclosed one form of circuit connections for the auxiliary coils I do not desire to limit myself to said connections as the accelerated vibrations may be effected in other ways.

When the battery back voltage has risen to a predetermined value, it is desirable to discontinue the charging current and furnish only sufficient current for the lamp load, if any exists. The pronounced rise in the counter-electromotive force of the battery, which may occur when the same is almost fully charged, causes a corresponding increase in generator voltage whereupon the voltage coil 19 attracts the pivoted contact arm 20 and closes the shunt circuit through the voltage responsive coils 21 and 22, associated with the respective cores 7 and 8. Inasmuch as the tendency of each resistance, vibrating core and contact, is to co-act to maintain constant the number of ampere turns acting on said core, the energization of said coils 21 and 22 causes an immediate reduction of the current in the series coils 5 and 6, due to the increased resistance of the generator field circuit. The generator current output is reduced almost to zero, if no lamps are in circuit. With a lamp load in circuit the current is reduced to substantially the value necessary to maintain the lamp load. The effect of the stop charge relay is to change the character of the regulation from current regulation to voltage regulation or to mixed current and voltage regulation with the voltage regulation predominating. The voltage coils 21 and 22 now control the character of the vibrations to maintain substantially constant the generator voltage.

If the speed of the generator armature is materially decreased so that the generator voltage falls below the battery voltage, the battery will discharge through the series winding of the automatic switch and open the same. Upon still further reduction in generator voltage, the stop charge relay opens the shunt circuit through the voltage coils 21 and 22. If the generator speed should now increase again, the operation of the system will be the same as previously described. It should be noted that the stop charge relay coil 19 is connected between the generator and the automatic switch and not beyond said automatic switch. In the latter position said relay coil would be subjected to battery current after the automatic switch had opened, thereby preventing said relay from falling open at the proper time.

Where the generator armature is driven from a car axle, the direction of rotation thereof may be in either direction depending upon the direction of travel of the car. Any suitable pole changing device (not shown) may be provided to maintain the proper polarity of the external circuit. This insures the charging of the storage battery in the proper direction.

It is apparent that various changes may be made in the structure and in the connections described, without departing from the spirit of the invention, and I desire therefore, to cover broadly any suitable equivalent means for accomplishing the desired results and falling within the scope of the appended claims.

I claim as my invention—

1. In a car lighting system, a variable speed generator having a shunt field winding, a main circuit extending therefrom, a resistance for regulating the field strength of the generator and connected in circuit with said winding, a pair of separable electrodes for controlling said resistance by rapidly short circuiting the same, a series electromagnetic winding arranged in said main circuit and operating said electrodes to cause the same to make and break contact, whereby the field strength of said generator is reduced as the output thereof tends to increase, and a shunt electromagnetic winding connected across said circuit and adapted to operate said electrodes to regulate said generator for substantially constant voltage upon predetermined voltage rise, the current regulation being substantially annulled when the voltage regulation becomes effective.

2. In a car lighting system, a variable speed generator having a shunt field winding, a plurality of resistances arranged in circuit therewith, a plurality of pairs of separable electrodes connected in circuit with said resistances, one for each resistance, electromagnetic means connected in circuit in series with the armature of said generator and operating said electrodes to cause those of each pair to make and break contact whereby the field strength of said generator is reduced as the current delivered thereby tends to increase, and additional electromagnetic means connected in a shunt circuit and responsive to a predetermined voltage rise of the system for substantially annulling the current regulation and substituting therefor voltage regulation.

3. In a car lighting system, a variable speed generator having a shunt field winding, a main circuit extending therefrom, a plurality of resistances of unequal values, connected in said shunt field circuit, a plurality of pairs of separable electrodes connected in circuit to short circuit said resistances, a plurality of electromagnets adapted to respond to currents of different value and serving to cause said electrodes to rapidly make and break contact succesively, said windings being arranged in said main circuit in series, whereby the field strength of the generator is reduced as the output of the generator tends to increase, a plurality of voltage responsive windings associated with said electrodes and adapted to vibrate the same to regulate the generator for constant voltage when the current responsive coils are inert, and voltage responsive means for connecting said voltage responsive windings in circuit to annul the current regulation and substitute predominating voltage regulation therefor.

4. In a car lighting system, a variable speed generator, and a regulator therefor, said regulator including a resistance adapted to be connected in the generator field circuit, and a pair of separable electrodes for controlling said resistance and a series winding responsive to the current delivered by said generator and arranged to cause said electrodes to vibrate rapidly and make and break contact, whereby the field strength of the generator is reduced as the output thereof tends to increase, to maintain practically constant current, and a shunt winding also arranged to vibrate said electrodes to regulate the generator for practically constant voltage, said series winding being mainly effective for regulating purposes below a certain predetermined voltage of the system, and said voltage winding being effective for regulating purposes above said predetermined voltage.

5. A system of generation and regulation, including a generator, and a regulator therefor, said regulator having a plurality of resistances adapted to be arranged in the field circuit of the generator, a plurality of pairs of separable electrodes, one for each resistance, each pair of electrodes being connected in the generator circuit to short circuit its corresponding resistance when in contact, a plurality of series windings, one for each pair of electrodes, said series windings being responsive to generator current to vibrate said electrodes, whereby said generator maintains constant current, a plurality of shunt windings, said shunt windings being responsive to generator voltage and adapted to vibrate said electrodes to regulate said generator for constant voltage, the voltage regulation following the current regulation as the voltage of the system increases.

6. A car lighting system including a generator, and a regulator therefor, said regulator including a resistance adapted to be connected in the field circuit of said generator, a pair of separable electrodes for controlling said resistance, a series winding responsive to the current delivered by said generator and arranged to cause said electrodes to vibrate rapidly to make and break contact, whereby the field strength of the generator is reduced as the output thereof tends to increase to maintain practically constant current, a shunt winding also arranged to vibrate said electrodes to regulate the generator for practically constant voltage and an auxiliary winding connected in said field circuit and in parallel with said resistance to modify said vibrations, said series winding being mainly effective for regulating purposes below a certain predetermined voltage of the system and said voltage winding being effective for regulating purposes above said predetermined voltage.

7. A car lighting system including a variable source of current, and regulating means therefor, said means including a vibratory regulating member, the means for operating said member including a coil responsive to the current flowing from said source, and a normally ineffective coil responsive to the voltage of said source, said latter coil being brought into operation to affect said vibratory member when a predetermined voltage of the source is reached.

8. In a car lighting system, a variable speed generator, a storage battery to be charged thereby, and a regulator for said generator, said regulator including a vibrating contact controlling the field strength of the generator and operating means for said contact including a voltage coil for maintaining a constant potential on said system, and means for rendering said voltage coil inoperative upon a predetermined decrease in voltage of the system.

9. In a car lighting system, a variable speed generator, a storage battery to be charged thereby, and a regulator for said generator, said regulator including a vibratory contact controlling the field strength of the generator, and operating means for said contact, including a voltage coil for maintaining a constant potential on said system, means for rendering said voltage coil inoperative upon a predetermined decrease in voltage of the system, and a current responsive coil adapted upon a substantial increase in current to cause vibration of said contact to limit the maximum value of current delivered by said generator.

10. In a car lighting system, a variable speed generator, a storage battery to be charged thereby, a vibratory regulator for said generator, and operating means for said regulator, said means including a current coil for operating said regulator upon a predetermined maximum current being delivered by said generator, and voltage responsive means adapted under predetermined conditions to supersede said current coil in the regulation of said generator.

11. In a car lighting system, a variable speed generator, a storage battery to be charged thereby, a vibratory regulator for said generator, and operating means for said regulator, said means including a current coil for operating said regulator upon a predetermined maximum current being delivered by said generator, voltage responsive means adapted under predetermined conditions to supersede said current coil in the regulation of said generator, and means for determining the point at which said voltage responsive means shall become effective to control the regulation.

12. In a car lighting system, a variable speed generator, a storage battery to be charged thereby, a vibratory regulator for said generator, and operating means for said regulator, said means including a current coil for operating said regulator upon a predetermined maximum current being delivered by said generator, voltage responsive means adapted under predetermined conditions to supersede said current coil in the regulation of said generator, and a relay responsive to battery voltage for determining the point at which said voltage responsive means shall become effective to control the regulator.

13. Regulating means for a circuit, including a vibratory contact and operating means therefor, said means including a current responsive coil, and a normally inert voltage responsive coil, and means whereby said voltage responsive coil may be rendered active to exert its effect on the vibrations of said contact.

In witness whereof, I have hereunto subscribed my name in the presence of two witnesses.

WILLIAM L. BLISS.

Witnesses:
CAMPBELL C. CARPENTER,
LAUREN A. PETTEBONE.